United States Patent
Jonas

(10) Patent No.: US 8,423,525 B2
(45) Date of Patent: Apr. 16, 2013

(54) LIFE ARCS AS AN ENTITY RESOLUTION FEATURE

(75) Inventor: Jeffrey James Jonas, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 12/750,289

(22) Filed: Mar. 30, 2010

(65) Prior Publication Data

US 2011/0246492 A1 Oct. 6, 2011

(51) Int. Cl.
*G06F 7/00* (2006.01)
*G06F 17/30* (2006.01)

(52) U.S. Cl.
USPC ............. 707/705; 707/713; 707/758; 706/12; 706/14; 706/20

(58) Field of Classification Search .................... None
See application file for complete search history.

(56) References Cited

U.S. PATENT DOCUMENTS

| | | | |
|---|---|---|---|
| 6,061,506 A * | 5/2000 | Wollaston et al. | 703/23 |
| 6,587,127 B1 * | 7/2003 | Leeke et al. | 715/765 |
| 7,307,523 B2 | 12/2007 | Kister et al. | |
| 7,630,986 B1 | 12/2009 | Herz et al. | |
| 7,668,772 B1 * | 2/2010 | Bent et al. | 705/35 |
| 7,685,201 B2 | 3/2010 | Zeng et al. | |
| 7,716,244 B2 * | 5/2010 | Abrams et al. | 707/785 |
| 7,734,557 B2 * | 6/2010 | Meehan et al. | 706/46 |
| 2003/0154194 A1 * | 8/2003 | Jonas | 707/3 |
| 2004/0203868 A1 | 10/2004 | Eidson | |
| 2006/0010119 A1 * | 1/2006 | Jonas | 707/3 |
| 2006/0287890 A1 * | 12/2006 | Stead et al. | 705/3 |
| 2007/0132767 A1 * | 6/2007 | Wright et al. | 345/475 |
| 2007/0171716 A1 * | 7/2007 | Wright et al. | 365/185.12 |
| 2007/0273514 A1 | 11/2007 | Winand et al. | |
| 2008/0059402 A1 | 3/2008 | Mulhern et al. | |
| 2008/0281831 A1 * | 11/2008 | Mindrum | 707/10 |
| 2008/0288424 A1 | 11/2008 | Iyengar et al. | |
| 2008/0301092 A1 * | 12/2008 | Jayanti et al. | 707/3 |
| 2009/0248738 A1 | 10/2009 | Martinez et al. | |
| 2009/0265106 A1 | 10/2009 | Bearman et al. | |
| 2009/0271862 A1 | 10/2009 | Allen et al. | |
| 2009/0303238 A1 | 12/2009 | Lam et al. | |
| 2009/0319515 A1 * | 12/2009 | Minton et al. | 707/5 |
| 2010/0094774 A1 * | 4/2010 | Jackowitz et al. | 705/36 R |
| 2010/0185984 A1 * | 7/2010 | Wright et al. | 715/833 |
| 2010/0205179 A1 * | 8/2010 | Carson et al. | 707/740 |
| 2010/0257092 A1 * | 10/2010 | Einhorn | 705/38 |

OTHER PUBLICATIONS

Godfrey et al.; "Using Origin Analysis to Detect Merging and Splitting of Source Code Entities", IEEE Transactions on Software Engineering, vol. 31, No. 2, (Feb. 2005), pp. 166-181.

Dodge et al.; "Towards a Taxonomy of Movement Patterns", Towards a Taxonomy of Movement Patterns, Information Visualization (2008) 7, pp. 240-252 / 1-12. Department of Geography, University of Zurich, Switzerland.

* cited by examiner

*Primary Examiner* — Angelica Ruiz
(74) *Attorney, Agent, or Firm* — Patterson & Sheridan, LLP

(57) ABSTRACT

Techniques are disclosed for performing identity resolution using life arcs as a feature. Space and time data may be received for an entity. A life arc template may be provided that specifies data that a life arc for each entity should include. A life arc may be generated for the entity based on the space and time data and the life arc template. An assertion for identity resolution may be made for the entity, based on the generated life arc.

20 Claims, 7 Drawing Sheets

204 — BILL SMITH
4/13/67
SEATTLE, WA

LIFE ARC TEMPLATE 1: LAST THREE CITIES LIVED AT FOR AT LEAST 9 MONTHS

306 — SAN DIEGO, CA
SAN FRANCISCO, CA
PHOENIX, AZ

202 — BILL SMITH
4/13/67
302 — SALEM, OR

304 — TAMPA, FL
BILOXI, MS
NEW YORK CITY, NY

LIFE ARCS AS AN ENTITY RESOLUTION FEATURE

BACKGROUND

1. Field

Embodiments of the invention relate to techniques for entity resolution. More specifically, embodiments of the invention relate to improving entity resolution using life arcs as a feature for entity resolution.

2. Description of the Related Art

Identity resolution applications attempt to answer the question "Who is who?"—i.e., determines when multiple records actually refer to the same entity (e.g., individual). For example, records identifying two women with different last names may in fact refer to the same woman having both a familial surname and a married surname. An example of an identity resolution application is the Identity Insight Server, available from International Business Machines Corp. (IBM®) of Armonk, N.Y.

SUMMARY

One embodiment of the invention includes a computer-implemented method for processing data records associated with a plurality of entities, each entity represented by a respective set of data records. The method may generally include resolving a received data record into an existing entity, resulting in a conjoined entity, and include generating a life arc for the conjoined entity based on at least space and time data contained in the received data record. The method may also include selecting a candidate entity based on the life arc generated for the conjoined entity and determining whether the candidate entity refers to the conjoined entity based on a comparison of at least one feature of the candidate entity and the conjoined entity.

Another embodiment of the invention includes a computer readable storage medium containing a program, which, when executed, performs an operation processing data records associated with a plurality of entities, each entity represented by a respective set of data records. The operation may generally include resolving a received data record into an existing entity, resulting in a conjoined entity, and include generating a life arc for the conjoined entity based on at least space and time data contained in the received data record. The operation may also include selecting a candidate entity based on the life arc generated for the conjoined entity and determining whether the candidate entity refers to the conjoined entity based on a comparison of at least one feature of the candidate entity and the conjoined entity.

Still another embodiment of the invention includes a system having one or more computer processors and a memory containing a program, which when executed by the one or more computer processors is configured to perform an operation processing data records associated with a plurality of entities, each entity represented by a respective set of data records. The operation may generally include resolving a received data record into an existing entity, resulting in a conjoined entity, and include generating a life arc for the conjoined entity based on at least space and time data contained in the received data record. The operation may also include selecting a candidate entity based on the life arc generated for the conjoined entity and determining whether the candidate entity refers to the conjoined entity based on a comparison of at least one feature of the candidate entity and the conjoined entity.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
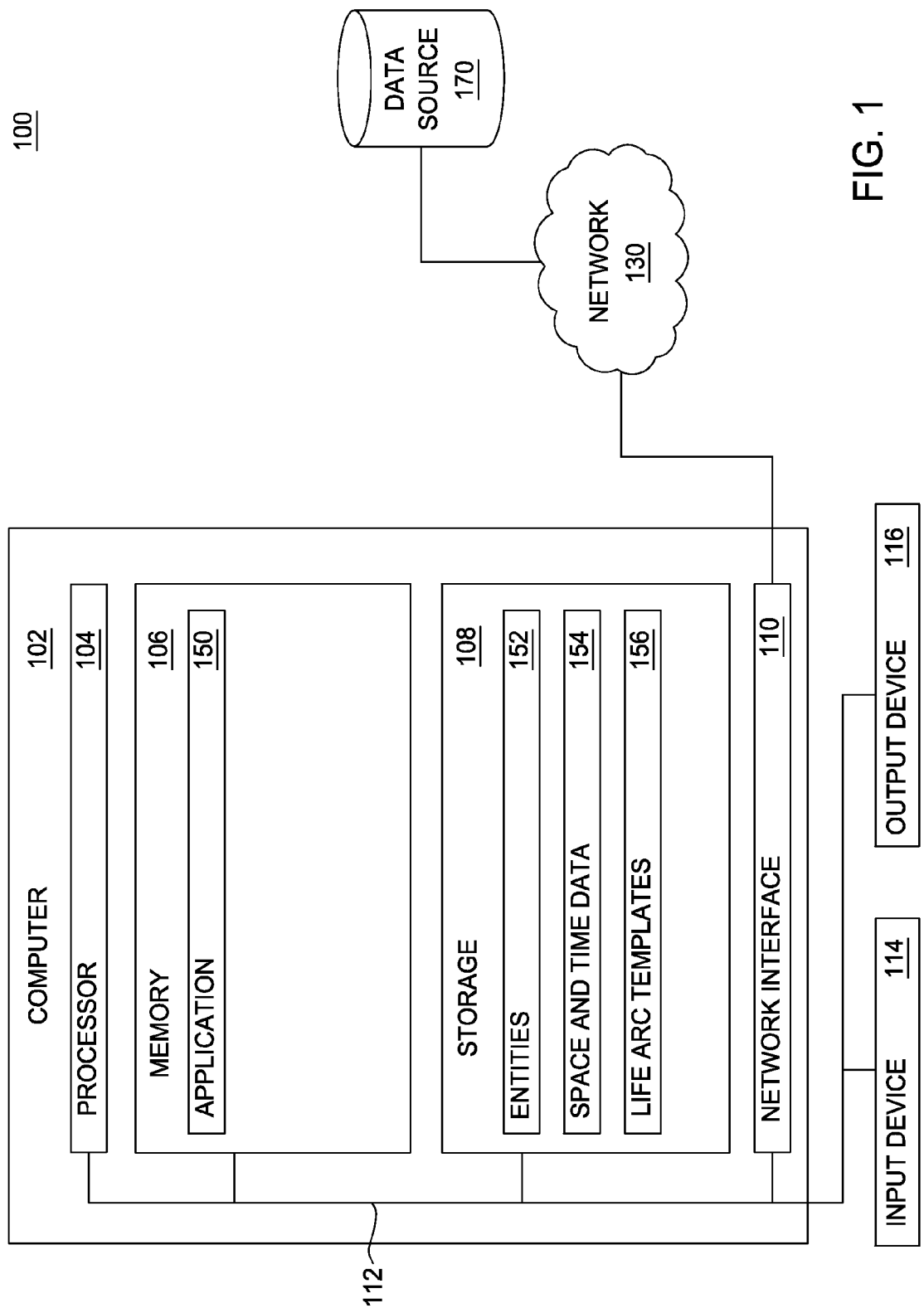
FIG. 1 is a block diagram illustrating a system for identity resolution, according to one embodiment of the invention.

Embodiments of the present invention generally provide techniques for identity resolution. One embodiment of the invention provides an application configured to resolve records containing identities to common entity dossiers, each representing a distinct individual. That is, the application may conjoin a record to an entity. Accordingly, a "conjoined" entity generally refers to an entity dossier to which one or more identity records have resolved into (e.g., by the application). For example, when "Bill Smith" checks into a hotel room, a residential address and telephone number from hotel check-in records may be used to match him as being the same person as a previously recognized entity dossier for a "William Smith" having the same address and phone number. To match "Bill Smith" to the entity dossier of "William Smith", the identity record representing "Bill Smith" is compared to a set of conjoined records, each a member of an entity dossier (referred to as an entity). However, comparing the new "Bill Smith" record may not contain additional features (e.g., residential address, date of birth, driver's license number, etc.) necessary to confirm a resolution. Thus, in one embodiment, the application determines whether sufficient space and time data is computable for an entity (a person, a car, a boat, a plane, an object, etc.)—based on predefined life arc templates. As used herein, a life arc refers to a composite feature (containing a plurality of space/time related data points) that characterizes an entity based on where and when the entity has been in the past. For example, a life arc for "Bill Smith" may specify the last three residential addresses of "Bill Smith." More generally, a life arc for an entity generates a signature for that entity, based on space and time data. The life arc for the entity may distinguish the entity from many other entities—based on life arcs of the other entities. In this regard, the life arc for the entity may be used to detect matches that otherwise may be missed or to prevent matches that should not be made.

In one embodiment, if sufficient space and time data is received, a set of candidate entities are generated based on this life arc—each such candidate to be evaluated for resolution as same or different. That is, while candidates are traditionally selected based on matching attributes like SSN or name and DOB, in this case, additional candidates that are based on solely life arcs may be included in the final candidate list. Advantageously, the application may resolve an inbound identity record to known entities more efficiently. For example, the application may resolve "Bill Smith" to the entity dossier for one "Mr. Smith" where existing features (other than life arcs) are insufficient to assert such a resolution. The application may also reverse earlier asserted entity resolutions—splitting an entity dossier (previously believed to be a single entity) into multiple entity dossiers or conversely, resolving two entities (previously believed to be distinct entities) into a single entity. For example, if the respective life arcs (specifying the last three residential addresses) suddenly becomes known, whereby two "Bill Smiths" (previously believed to be distinct entities) can now be resolved to each other, the application may discover and resolve these two "Bill Smiths" into one entity. The application may also confirm (strengthen) earlier assertions about entities—such as confirming that multiple entities still believed to be distinct entities rather than a single entity.

In this regard, data about how people have moved through time and space may be used to generate signatures—life arcs—that can be used to perform identity resolution more efficiently and/or accurately. That is, in addition to conventional features such as date of birth, phone, email, etc., the application may also consider computed life arc features for the entities. As space-time coordinates for an entity become available over time (or in some cases life arcs may be presented in a single record e.g., a single record the reveals the last three residential addresses of an identity), the application may use one or more life arcs for identity resolution or to re-evaluate previous identity resolution assertions.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 for identity resolution, according to one embodiment of the invention. An entity (dossier) may be a set of identity records believed to refer to the same person. The networked system 100 includes a computer 102. The computer 102 is connected to a data source 170 via a network 130. In one embodiment, the data source 170 is a data store (e.g., a relational database) that may contain space and time data. For example, the data source 170 may belong to a data aggregator such as a credit bureau or a telecommunications company and may include data such as historical residential addresses for an entity. The space and time data may include historical geo-locational data for an entity such as ones movement in coordinates (e.g., based on GPS or cellular phones tower triangulation, etc.). And while embodiments are described herein with reference to GPS, other navigation systems such as GLONASS, Galileo, and Global Navigation Satellite System (GNSS) may be supported by embodiments of the invention and are broadly contemplated. The space and time data may also include movement and location of entities/identities obtained through any means whether messages posted to social network sites with self-identified location artifacts. Further, novel sensors may be derived from user-generated content (e.g., cities traveled to claims made on a social networking website or blog). Another example would be activity patterns such as the five most common parties that an individual calls (or otherwise messages) via cell phone, or most common email address a person sends mail to, etc.

The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers and the data source 170 via the network 130.

The storage 108 may be a persistent storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 150 for identity resolution. The storage 108 of the computer 102 includes entities 152, space and time data 154 for the entities 152, and life arc templates 156. In one embodiment, the application 150 may receive the space and time data 154 from the data source 170. Based on predefined life arc templates 156, the application 150 may determine whether sufficient space and time data 154 is received to warrant a resolution event and/or re-evaluating previously resolved entities. For example, based on a predefined life arc template of "last three residential addresses that each entity lived at for at least nine months," the application 150 may generate a corresponding life arc for each entity. For instance, the application 150 may generate a life arc of "Tampa, Fla.; Biloxi, Miss.; NY, N.Y." for "Bill Smith."

In one embodiment, the application 150 may identify life arcs that are more distinguishing entities than others. For example, the life arc template for residential address history of "Tampa, Fla.; Biloxi, Miss.; New York City, N.Y." may reveal only 5 candidate entities out of a total of 100,000 entities, while the life arc of "San Francisco, Calif.; New York City, N.Y.; San Francisco, Calif." may reveal 1,500 candidates out of the total of 100,000 entities. Because only a small percentage of entities have the "Tampa, Fla.; Biloxi, Miss.; New York City, N.Y." life arc, the application 150 may identify this life arc as being more discriminating and useful than the other life arc. In one embodiment, the application 150 may identify useful life arcs based on a predefined threshold. For example, the application 150 may identify life arcs yielding ten or fewer candidates as being useful for selecting resolution candidate entities. The application 150 may use life arcs plus additional distinguishing attributes (e.g., year of birth) or only life arcs—i.e., life arcs identified as being useful for developing candidate entities for resolution. The application 150 may also, over time, learn which life arcs are more or less discriminating by tracking the number of discreet entities. For example, the application 150 may maintain a list of life arcs (including templates and specific template values) identified as effective and a list of life arcs identified as ineffective.

As described above, in one embodiment, based on predefined life arc templates 156, the application 150 may determine whether sufficient space and time data 154 is received to compute a specific life arc and then this new life arc will be used to evaluate a current resolution and may as well trigger re-evaluating previous entity resolutions. When re-evaluating previous entity resolutions, the application 150 may split an entity (previously believed to be a single entity) into multiple entities on the basis of the space and time data 154. The application 150 may also resolve two entities (previously believed to be distinct entities) into a single entity on the basis of the space and time data 154 (e.g., via life arcs generated for the two entities, based on the templates 156). The application 150 may also determine whether an inbound identity record is a known entity or a new entity (prior to conjoining or splitting), based on the space and time data 154.

Figure 2:
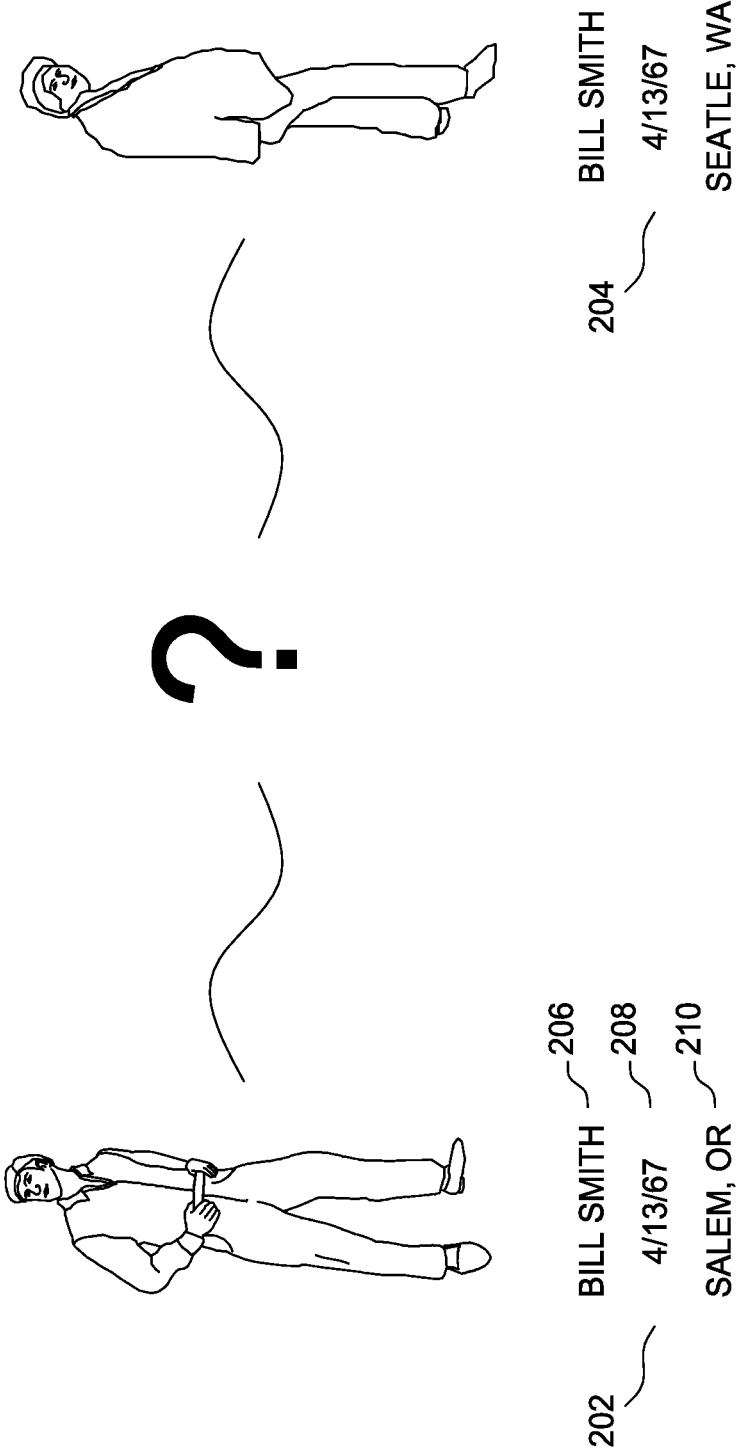
FIG. 2 illustrates two identity records, according to one embodiment of the invention.

Suppose that a user is trying to identify voters who are registered in more than one state. FIG. 2 illustrates two entity dossiers 202, 204, according to one embodiment of the invention. As shown, each entity includes a name 206, a date of birth 208, and a location 210. In one embodiment, the application 150 may seek to determine whether entities 202, 204 refer to a single individual who is registered to vote in both Oregon and Washington. However, based only on an identical name 206 and an identical date of birth 208, it may not be possible to establish with an acceptable degree of certainty whether the two entities 202, 204 refer to the same individual. Accordingly, in this scenario, the application 150 may be unable to make any assertion regarding the two entities 202, 204.

However, space and time data 154 may be acquired and may indicate that the two entities 202, 204 are two distinct individuals (rather than to the same one). In particular, the application 150 may compute life arcs for entities 202, 204 based on space and time data received for each entity 202, 204 and the life arc templates 156. By comparing the computed life arcs with one another, the application 150 can reveal a strong signal (singularly the basis for resolution or in combination with other entity features) for establishing whether the two entites 202, 204 should be resolved or not. For example, if the respective life arcs for entities 202, 204 do not closely match, the application 150 may determine that the entities 202, 204 refer to different individuals—despite the presence of other matching data of the identity records (e.g., name and date of birth).

In one embodiment, a life arc template 156 specifies what kind of data is included in a life arc. The life arc template may specify any type of data that can be generated from the space and time data 154. For example, the life arc template may specify that the life arc for each entity (i.e., based on the conjoined records believed to reference a particular individual) includes residences that an individual has lived in, places an individual has worked at, a path of movement over time (e.g., the path an individual drives to work, or what cities/countries the entity has visited, etc) or other patterns like top ten people called over any thirty days. The life arc template may also include logic specifying a chronological order of the data. For example, the life arc template may specify that the life arc for each entity includes the three most recent residences that the respective entity has lived in, in chronological order.

In one embodiment, the life arc template may also include logic specifying a frequency order of the data. For example, a template may specify that the life arc for each entity includes the three cities visited most frequently by the respective entity or the order of those called most often in order of frequency. As another example, a template may specify that the life arc for each entity includes the three places (stores, buildings, etc.) that the respective entity has been at most often on Thursdays between noon and 3 pm. The life arc template may also specify temporal constraints (e.g., time-of-day, day-of-week, etc.). For example, a template may specify that the life arc for each entity includes the two places that the respective entity spends the most time at during daytimes at weekdays and at weekends, respectively. In one embodiment, the application 150 may also compute life arc templates and, over time, learn which life arc templates are suited for performing identity resolution—e.g., by identifying which life arc templates yield life arcs that are more discriminating for candidate selection and entity resolution.

Figure 3A:
FIGS. 3A-3B illustrate life arcs generated from life arc templates, according to one embodiment of the invention.
Figure 3A:
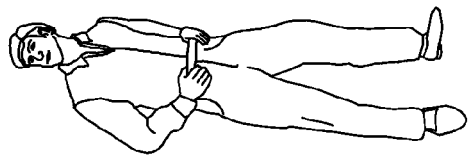

FIG. 3A illustrates life arcs 304, 306 generated from a life arc template 302, according to one embodiment of the invention. As shown, the life arc template 302 specifies that the life arc for each entity includes the last three cities that the respective entity lived at for at least nine months. The application 150 may generate the life arcs 304, 306 from the space and time data 154. For example, assume that the space and time data 154 for the first entity 202 indicates that Bill Smith lived in Washington, D.C. and Baltimore, Md., each for three months; Tampa, Fla. for one year; Biloxi, Miss. for three years, and New York City, N.Y. for two years. Because Washington, D.C. and Baltimore, Md. do not satisfy the condition of "at least nine months" specified by the life arc template 302, the application 150 does not include Washington, D.C. and Baltimore, Md. in the life arc 304. Thus, the life arc 304 includes only Tampa, Fla.; Biloxi, Miss.; and New York City, N.Y. Similarly, the life arc 306 for the second entity 204 includes San Diego, Calif.; San Francisco, Calif.; and Phoenix, Ariz.

In one embodiment, the application 150 may use the generated life arcs 304, 306 as a feature to resolve the entities 202, 204 to distinct entities. That is, the life arcs may be used to recognize that the records for "Bill Smith" having a birth date of Apr. 13, 1967 from Salem, Oreg., and Seattle, Wash. in fact refer to two different people. As shown in FIG. 3A, the life arc generated from the template for Bill Smith of Salem last lived in Tampa, Biloxi, and New York for at least nine months each, while the life arc generated from the template for Bill Smith of Seattle last lived in San Diego, San Francisco, and Phoenix for at least nine months each. This tends to indicate that the Bill Smith of Salem and the Bill Smith of Seattle are two different people. Accordingly, the application 150 may resolve the entities 202, 204 to distinct entities, on the basis of the generated life arcs 304, 306.

Figure 3B:
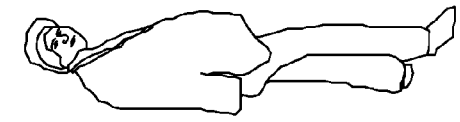
Figure 3B:
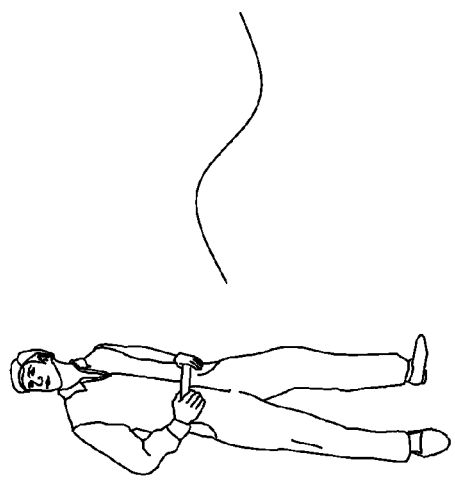

FIG. 3B illustrates another example of life arcs 314, 316 generated from a life arc template 312, according to one embodiment of the invention. In this example, the life arc template 312 specifies that the life arc for each entity includes three locations that the respective entity spends the most time at during weekdays between 9 am and 5 pm. The application 150 may generate the life arcs 314, 316 from the space and time data 154. As shown in FIG. 3B, the Bill Smith of Salem spends most of his daytime weekday hours at the Salem Police Department, at Salem Coffee & Donuts, and in downtown Salem, while the Bill Smith of Seattle spends most of his daytime weekday hours at Seattle High School, Seattle Recreational Park, and Seattle Galleria Shopping Center. This also tends to indicate that the Bill Smith of Salem and the Bill Smith of Seattle are two different people. Accordingly, the application 150 may resolve the entities 202, 204 to distinct entities, on the basis of the generated life arcs 314, 316.

In one embodiment, the application 150 may evaluate whether a life arc is suitable for developing candidate entities for resolution. For example, the past ten years of residential addresses for an entity may constitute a feature shared by few other entities. Similarly, physical movement of the entity over the past three days may also be a distinguishing entity feature. For instance, if an unknown individual replaces one mobile phone with another (e.g., a person using minutes on a prepaid mobile phone) the application 150 may determine that the users of the respective mobile phones are the same individual (provided geolocational data is captured and stored from both phones). That is, the life arc of the current location of an individual, even when sampled over short periods, may provide a very strong signal that the users of both the first and second mobile phone are, in fact, the same individual. The top ten parties called by the individual may similarly provide a strong life arc signal.

As another example, assume that a life arc template specifies that the life arc for each entity includes three most recent residential addresses at which the entity stayed at for a duration that is greater than 90 days. The life arc template may be abbreviated as "RA1:RA2:RA3" where RA stands for residential address. The application 150 may process each entity with three residential addresses of the minimum duration and maintain a counter that represents the number of distinct entities sharing the same life arcs corresponding to the life arc template. For example, Suppose Tom Smith has the following residential addresses:

TABLE I

| Residential addresses for Tom Smith | |
|---|---|
| RA1 | 123 1st street |
| RA2 | 768 Tailor Way |
| RA3 | 9001 Medusa Apt 321 |

In one embodiment, the application 150 may determine that the life arc "123 1st street:768 Tailor Way:9001 Medusa Apt 321" describes one unique entity—i.e., Tom Smith. Assume that the application 150 receives a space and time data update that indicates that Tom has a wife who shares the same three residential addresses. The application 150 may increment the counter for the life arc "123 1st street:768 Tailor Way:9001 Medusa Apt 321" to two—representing two unique entities share this same life arc. The application 150 may also define a threshold count (e.g., 50 unique entries), beyond which a life arc is no longer deemed suitable for developing resolution candidates. Similarly, the application 150 may also evaluate whether a life arc template is suitable for not just developing candidate entities but also for entity resolution itself (like in the Bill Smith example above).

Figure 4:
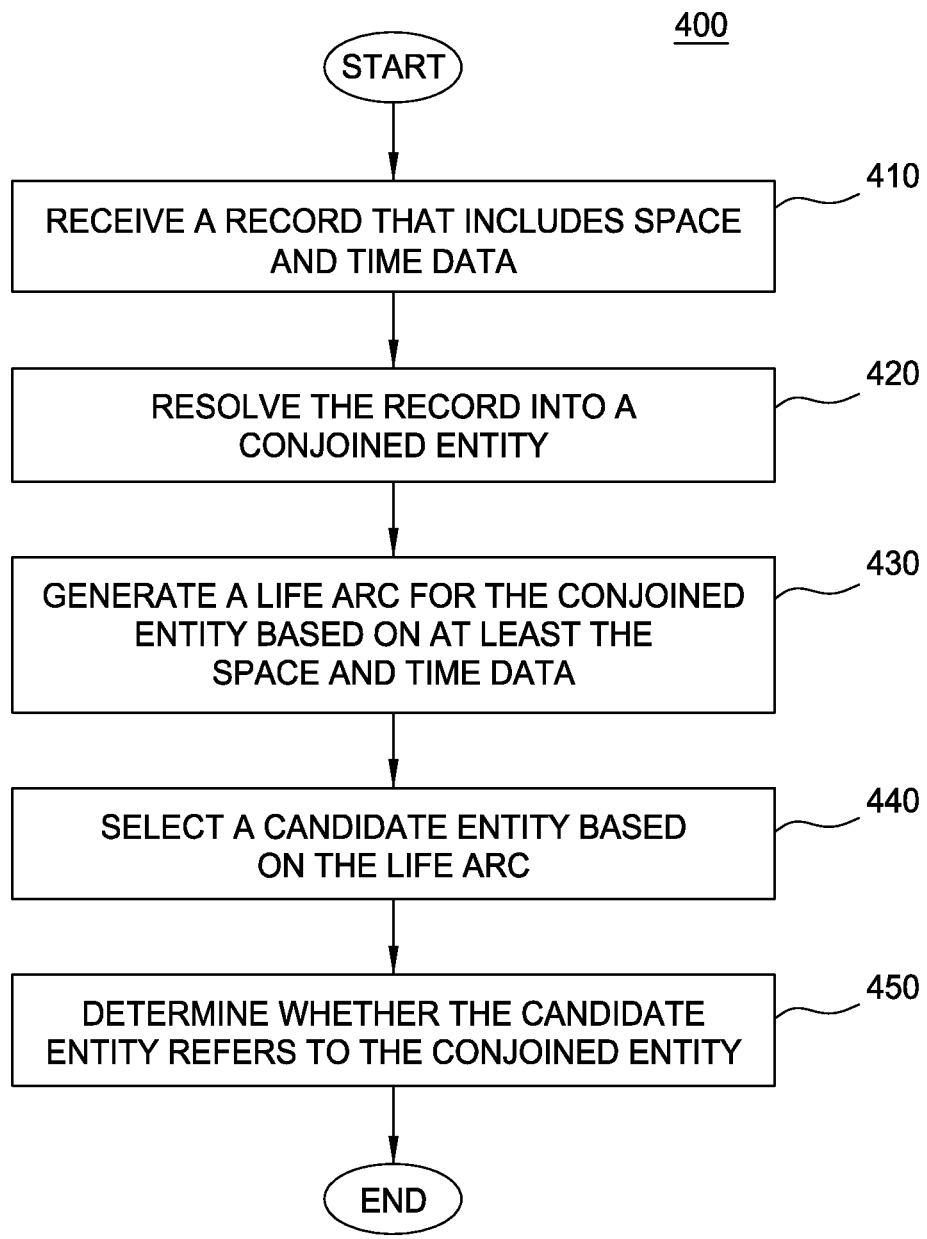
FIG. 4 is a flowchart depicting a method for determining whether two identity records refer to the same individual, according to one embodiment of the invention.

FIG. 4 is a flowchart depicting a method 400 for determining whether a conjoined entity and a candidate entity refer to the same individual, according to one embodiment of the invention. As described above, a conjoined entity generally refers to an entity dossier to which a given identity record has been resolved into (e.g., by the application) while being evaluated. Additionally, a candidate entity generally refers to an entity dossier that is a candidate for being resolved to another entity dossier (e.g., as determined by the application). For example, given two entities representing "Bill Smith" sharing a common birth date of Apr. 13, 1967, the method 400 may be performed to help determine whether these records, in fact, refer to two distinct individuals. As shown, the method 400 begins at step 410, where the application 150 receives an identity record that includes space and time data. At step 420, the application 150 resolves the identity record into a conjoined entity.

In one embodiment, resolving the identity record into the conjoined entity may result in the conjoined entity having sufficient space and time data to form a life arc. For example, the conjoined entity representing "Bill Smith" may include residential addresses RA1 and RA2. However, two residential addresses may be insufficient to form a life arc based on the life arc template of "RA1:RA2:RA3". At this point, the identity record may arrive, which includes a residential address RA3. After the identity record is resolved into the conjoined entity, the application 150 may generate a life arc for the conjoined entity using the life arc template (step 430). That is, the application 150 may generate the life arc for the conjoined entity using space and time data contained in the identity record and space and time data contained in previously-received identity records (that were also resolved into the conjoined entity).

At step 440, the application 150 selects one or more candidate entities based on the life arc generated for the conjoined entity. For example, the application 150 selects a candidate entity having the same three residential addresses as the conjoined entity. The life arc may be a stronger distinguishing feature of the candidate entity than other, traditional features (e.g., full name). Thus, it may still be worthwhile to evaluate a candidate entity having a matching life arc but having few (or no) other matching features (with the conjoined entity).

For example, suppose a life arc of "San Diego, Calif.; San Francisco, Calif.; and Phoenix, Ariz." is generated for Bill Smith. The application 150 may identify a candidate entity, representing Bill Jones, as having a matching life arc. Despite a mismatched "full name" feature, the application 150 may determine that Bill Jones and Bill Smith in fact refer to the same individual based on the life arc and/or other features (for example, Bill Jones at one point may have decided to adopt the maiden name of his mother, "Smith", as his last name). In this regard, while the life arc is used to select candidate entities, the life arc need not necessarily be used in determining whether each candidate entity refers to the conjoined entity. For example, the application 150 may determine that Bill Jones and Bill Smith in fact refer to the same individual based on the features of age, gender, and telephone number.

At step 450, the application 150 determines whether the candidate entity refers to the conjoined entity based on a comparison of their respective feature(s). For example, the application 150 may compare a social security number, a full name, a date of birth, a phone number, and/or any life arc(s). If the application 150 determines that the candidate entity refers to the conjoined entity, the application 150 may resolve the candidate entity into the conjoined entity. After the step 450, the method 400 terminates.

Figure 5:
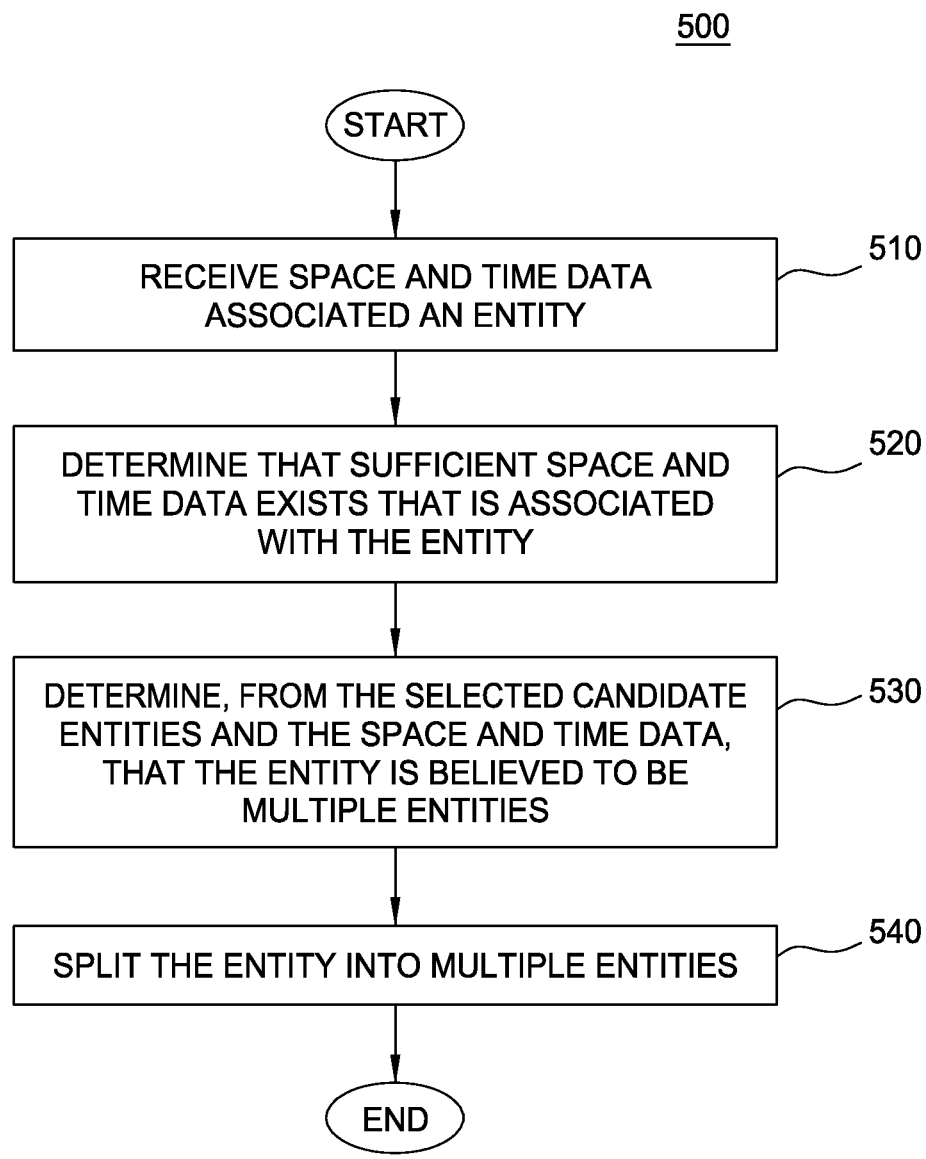
FIG. 5 is a flowchart depicting a method for splitting an entity into multiple entities based on space and time data, according to one embodiment of the invention.

FIG. 5 is a flowchart depicting a method 500 for splitting an entity into multiple entities based on space and time data, according to one embodiment of the invention. As shown, the method 500 begins at step 510, where the application 150 receives a record containing space and time data. The space and time data may include an address history, GPS location data, job history, etc. At step 520, the application 150 may determine that sufficient space and time data exists to compute a new life arc for the entity. For example, the application 150 may receive a space and time data update that includes a third most recent residential address for the entity—allowing the application 150 to compute a life arc of "three most recent residential addresses" for the entity.

At step 530, the application 150 determines if the new life arcs invalidate any members (records) in the conjoined entity. That is, the application 150 may determine if the entity now containing a new life arc really represents multiple entities. For example, the application 150 may determine—from the generated life arcs—that the entity is believed to be multiple entities. At step 540, the application 150 may split the entity into multiple entities. The application 150 may also alert a user of the split. After the step 540, the method 500 terminates.

Figure 6:
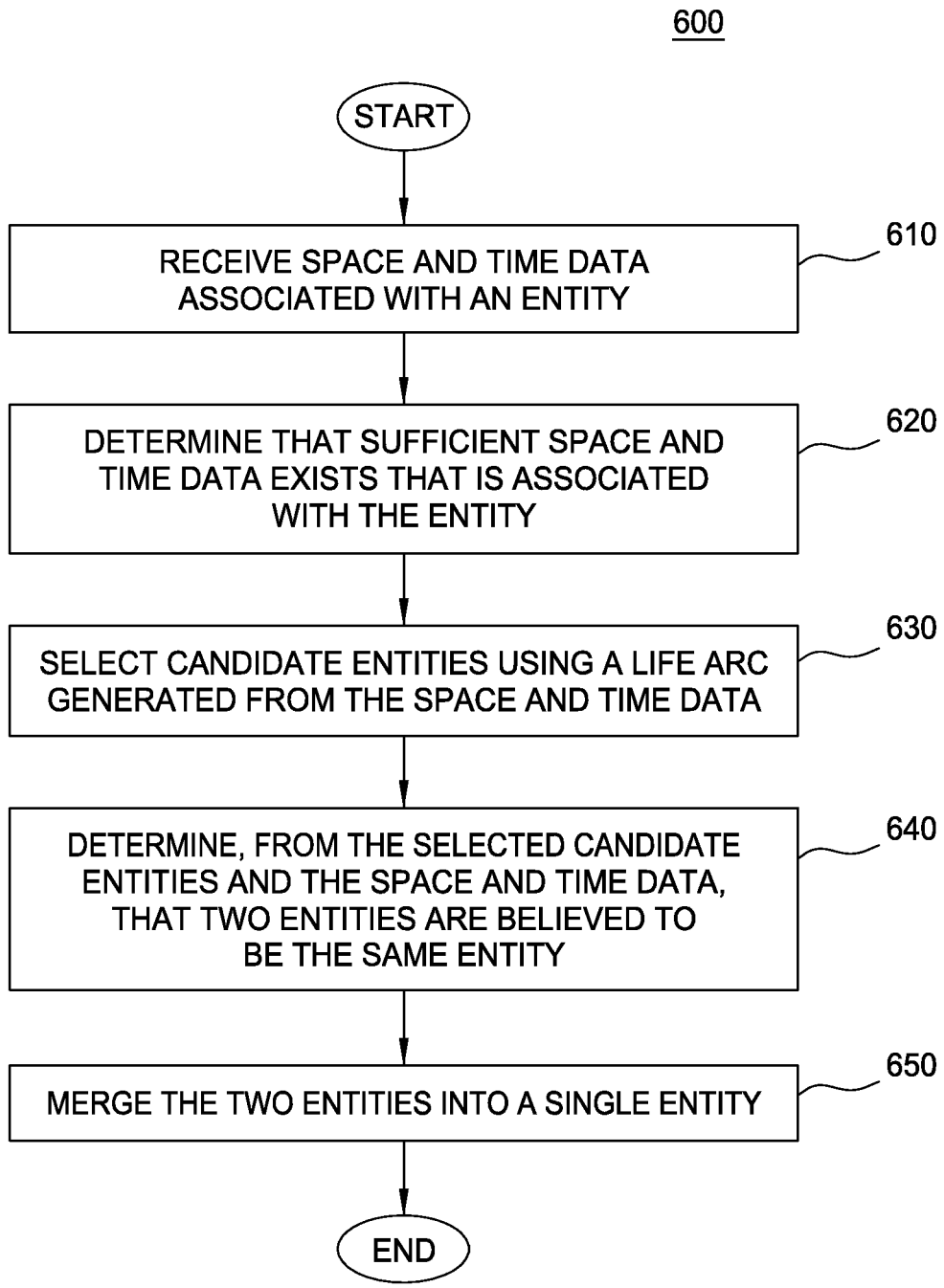
FIG. 6 is a flowchart depicting a method for resolving two distinct entities into a single entity based on space and time data, according to one embodiment of the invention.

FIG. 6 is a flowchart depicting a method 600 for resolving (conjoining) two distinct entities into a single entity based on space and time data, according to one embodiment of the invention. As shown, the method 600 begins at step 610, where the application 150 receives space and time data associated with an entity. The space and time data may include an address history for the entity, GPS location data for the entity, etc. At step 620, the application 150 may determine that sufficient space and time data exists that is associated with the entity. For example, the application 150 may receive a space and time data update that includes a third most recent residential address for the entity—allowing the application 150 to generate a life arc of "three most recent residential addresses" for the entity.

At step 630, the application 150 may select candidate entities using the space and time data. For example, the application 150 may select candidate entities having the same "three most recent residential addresses" as the entity. At step 640, the application 150 may resolve the entity and the candidate entities based on the space and time data. For example, the application 150 may generate life arcs for the candidate entities and determine—from the generated life arcs—that the two distinct entities (e.g., the entity and a candidate entity) are believed to be the same entity after all. At step 650, the application 150 may resolve the two distinct entities into a single entity. After the step 650, the method 600 terminates. In an alternative embodiment, at the step 640, the application 150 may also use the generated life arcs for the candidate entities to expand the candidate list (building on the list of candidates from the step 630). The application 150 may then evaluate secondary and tertiary candidate entities for resolution into the single entity.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide techniques for using life arcs as a feature in performing entity resolution. In one embodiment, an application for entity resolution may receive space and time data for entities. The application may generate life arcs for entities based on the space and time data and based on predefined life arc templates. The application may generate a set of candidate entities based on the life arcs. The application may make an assertion or re-evaluate a previously made assertion for identity resolution. For example, the application may determine, from the life arcs, that two entities—previously believed to be distinct entities—are the same entity. The application may also determine, from the life arcs, that an entity—previously believed to be a single entity—includes multiple distinct entities. Advantageously, using by generating life arcs for the entities based on the received space and time data, the application may perform identity resolution more efficiently and/or accurately. That is, in addition to conventional features such as date of birth, phone, email, etc., the application may also consider life arc features computed for the entities.

While the foregoing is directed to embodiments of the present invention, other and further embodiments of the invention may be devised without departing from the basic scope thereof, and the scope thereof is determined by the claims that follow.

What is claimed is:

1. A computer-implemented method to provide a restricted set of candidate entities for entity resolution, based on a life arc, the method comprising:
   resolving a received data record into an existing entity, resulting in a conjoined entity representing a subject selected from a person, a vehicle, and an object;
   generating a life arc for the conjoined entity based on a life arc criterion and space and time data contained in the received data record, wherein the life arc represents that the subject was at each of a specified plurality of distinct geographical locations during a respective, specified time period that is distinct;
   generating a restricted set of candidate entities from a plurality of available entities greater in number than the restricted set of candidate entities and by operation of one or more computer processors, wherein each of the plurality of available entities represents a distinct subject in the entity resolution system, wherein the restricted set of candidate entities includes: (i) a first candidate entity selected based on the first candidate entity having a life arc matching the life arc generated for the conjoined entity and (ii) a second candidate entity selected based on a matching attribute that is not a life arc; and
   determining whether the first candidate entity refers to the conjoined entity based on a comparison of at least one attribute of the first candidate entity and the conjoined entity, wherein the at least one attribute compared between the first candidate entity and the conjoined entity is not a life arc, wherein at least one of the first candidate entity and the conjoined entity are output responsive to a request from a requesting entity.

2. The computer-implemented method of claim 1, further comprising:
   upon determining that the candidate entity refers to the conjoined entity, resolving the candidate entity into the conjoined entity.

3. The computer-implemented method of claim 2, further comprising:
   upon determining that the candidate entity does not refer to the conjoined entity, not conjoining the candidate entity into the conjoined entity.

4. The computer-implemented method of claim 3, wherein the space and time data is selected from at least one of an address history, a credit history, and geolocational movement data, wherein the geolocational movement data comprises a latitude, a longitude, and a time stamp.

5. The computer-implemented method of claim 4, wherein the definition for the life arc includes at least one temporal constraint, and wherein each life arc is further generated based on a life arc template specifying a life arc criterion for the respective life arc.

6. The computer-implemented method of claim 5, wherein the life arc characterizes the space and time data obtained for the conjoined entity, wherein the at least one candidate entity shares at least one attribute with the conjoined entity, and wherein the at least one attribute comprises the life arc.

7. A computer-readable storage medium containing a program which, when executed, performs an operation to provide a restricted set of candidate entities for entity resolution, based on a life arc, the operation comprising:
   resolving a received data record into an existing entity, resulting in a conjoined entity representing a subject selected from a person, a vehicle, and an object;
   generating a life arc for the conjoined entity based on a life arc criterion and space and time data contained in the received data record, wherein the life arc represents that the subject was at each of a specified plurality of distinct geographical locations during a respective, specified time period that is distinct;
   generating a restricted set of candidate entities from a plurality of available entities greater in number than the restricted set of candidate entities and by operation of one or more computer processors when executing the program, wherein each of the plurality of available entities represents a distinct subject in the entity resolution system, wherein the restricted set of candidate entities includes: (i) a first candidate entity selected based on the first candidate entity having a life arc matching the life arc generated for the conjoined entity and (ii) a second candidate entity selected based on a matching attribute that is not a life arc; and
   determining whether the first candidate entity refers to the conjoined entity based on a comparison of at least one attribute of the first candidate entity and the conjoined entity, wherein the at least one attribute compared between the first candidate entity and the conjoined entity is not a life arc, wherein at least one of the first candidate entity and the conjoined entity are output responsive to a request from a requesting entity.

8. The computer-readable storage medium of claim 7, wherein the operation further comprises:
   upon determining that the candidate entity refers to the conjoined entity, resolving the candidate entity into the conjoined entity.

9. The computer-readable storage medium of claim 8, wherein the operation further comprises:
   upon determining that the candidate entity does not refer to the conjoined entity, not conjoining the candidate entity into the conjoined entity.

10. The computer-readable storage medium of claim 9, wherein the space and time data is selected from at least one of an address history, a credit history, and geolocational movement data, wherein the geolocational movement data comprises a latitude, a longitude, and a time stamp.

11. The computer-readable storage medium of claim 10, wherein the definition for the life arc includes at least one temporal constraint, and wherein each life arc is further generated based on a life arc template specifying a life arc criterion for the respective life arc.

12. The computer-readable storage medium of claim 11, wherein the life arc characterizes the space and time data obtained for the conjoined entity, wherein the at least one candidate entity shares at least one attribute with the conjoined entity, and wherein the at least one attribute comprises the life arc.

13. A system to provide a restricted set of candidate entities for entity resolution, based on a life arc, the system comprising:
one or more computer processors;
a memory containing a program which, when executed by the one or more computer processors, is configured to perform an operation comprising:
resolving a received data record into an existing entity, resulting in a conjoined entity representing a subject selected from a person, a vehicle, and an object;
generating a life arc for the conjoined entity based on a life arc criterion and space and time data contained in the received data record, wherein the life arc represents that the subject was at each of a specified plurality of distinct geographical locations during a respective, specified time period that is distinct;
generating a restricted set of candidate entities from a plurality of available entities greater in number than the restricted set of candidate entities, wherein each of the plurality of available entities represents a distinct subject in the entity resolution system, wherein the restricted set of candidate entities includes: (i) a first candidate entity selected based on the first candidate entity having a life arc matching the life arc generated for the conjoined entity and (ii) a second candidate entity selected based on a matching attribute that is not a life arc; and
determining whether the first candidate entity refers to the conjoined entity based on a comparison of at least one attribute of the first candidate entity and the conjoined entity, wherein the at least one attribute compared between the first candidate entity and the conjoined entity is not a life arc, wherein at least one of the first candidate entity and the conjoined entity are output responsive to a request from a requesting entity.

14. The system of claim 13, wherein the operation further comprises:
upon determining that the candidate entity refers to the conjoined entity, resolving the candidate entity into the conjoined entity.

15. The system of claim 14, wherein the operation further comprises:
upon determining that the candidate entity does not refer to the conjoined entity, not conjoining the candidate entity into the conjoined entity.

16. The system of claim 15, wherein the space and time data is selected from at least one of an address history, a credit history, and geolocational movement data, wherein the geolocational movement data comprises a latitude, a longitude, and a time stamp.

17. The system of claim 16, wherein the definition for the life arc includes at least one temporal constraint, and wherein each life arc is further generated based on a life arc template specifying a life arc criterion for the respective life arc.

18. The system of claim 17, wherein the life arc characterizes the space and time data obtained for the conjoined entity, wherein the at least one candidate entity shares at least one attribute with the conjoined entity, and wherein the at least one attribute comprises the life arc.

19. The system of claim 18, wherein the identity record is matched against each candidate entity in the restricted set of candidate entities and not matched against at least one available entity not in the restricted set of candidate entities, to avoid incurring processing costs associated with matching against the at least one available entity;
wherein each distinct geographical location pertains to the physical world and is associated with a distinct time period characterizing the conjoined entity, wherein each distinct geographical location represents that the conjoined entity is at the respective distinct geographical location during the associated distinct time period, wherein the life arc of the first candidate entity matching the life arc of the conjoined entity includes matching geographical locations and matching time periods.

20. The system of claim 19, wherein the first candidate entity is determined to refer to the conjoined entity based on satisfying a predefined similarity score computed based on matching attributes between the first candidate entity and the conjoined entity, wherein the matching life arc has a higher contribution to the similarity score than the matching attribute that is not a life arc;
wherein the life arc is disqualified from being used in generating candidate entities for the received data record and one or more subsequently received data records, upon determining that the life arc has generated a count of candidate entities exceeding a predefined disqualification threshold.

* * * * *